Dec. 10, 1963  S. T. HENDERSON  3,114,067
FLUORESCENT LAMP PARTICULARLY SUITED TO ILLUMINATION
OF OBJECTS CONTAINING RED
Filed June 24, 1960
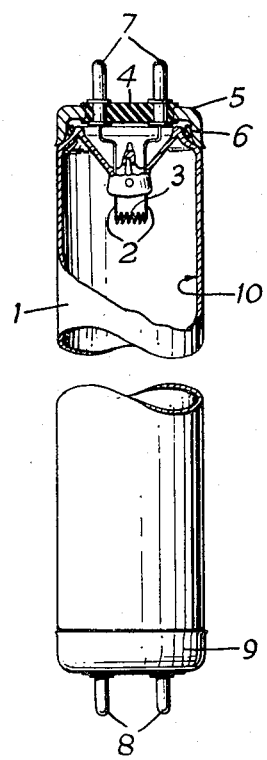
STANLEY THOMAS HENDERSON
INVENTOR
BY Lawrence Burns,
ATTORNEY

United States Patent Office 3,114,067
Patented Dec. 10, 1963

3,114,067
FLUORESCENT LAMP PARTICULARLY SUITED TO ILLUMINATION OF OBJECTS CONTAINING RED
Stanley Thomas Henderson, London, England, assignor to Thorn Electrical Industries Limited, London, England, a British company
Filed June 24, 1960, Ser. No. 38,583
Claims priority, application Great Britain June 26, 1959
9 Claims. (Cl. 313—109)

The present invention relates to improved low-pressure fluorescent lamps containing mercury and argon or other rare gas or mixture of such gases, and to phosphor compositions therefor.

In designing fluorescent lamps to give good colour rendering attempts have previously been directed to achieving a special energy distribution similar to that of the incandescent tungsten filament lamp. Such attempts have provided an increase of red emission above that of conventional fluorescent lamp phosphors, for example the halophosphate phosphors (widely used for their efficiency), and at the same time a reduction of the blue emission, especially of the mercury 4358 A. line which is very prominent in the low pressure argon-mercury discharge. The resulting lamps are most successful when their colour is in the "warm white" region, that is of a chromaticity close to that of a black body at about 2900° K., which is similar to that of a tungsten filament lamp of moderate wattage. Though such lamps may produce a pleasing illumination in "social" surroundings such as restaurants and ballrooms, where no reference to daylight appearances is likely, they are not so successful in shops where the appearance of such materials as food and textiles, under such yellowish lamps can readily be seen to be quite different from that in daylight.

It has now been found that it is possible to make fluorescent lamps containing a phosphor coating which will produce a light of a colder colour, that is containing a greater blue component, than the lamps described above, and at the same time give adequate emission at other wavelengths, particularly above 6000 A. Such lamps have considerably enhanced colour rendering properties, and give a pleasing appearance to a wide variety of coloured objects, including raw meat, vegetables and fish, cooked foods, beverages, textiles used for clothing, white objects which often look unnatural under conventional fluorescent lighting, and especially human complexions.

According to the present invention there is provided a low pressure fluorescent lamp containing mercury and argon or other rare gas or mixture of such gases, and having a phosphor coating which includes at least 15% by weight of a first luminescent material having an emission peak in the region 6500–6700 A., at least 15% of a second luminescent material having an emission peak in the region 6000–6500 A., the first and second materials amounting in total to not more than 70% by weight of the coating, and at least one further luminescent material emitting over a wide band including the blue region of the spectrum.

In the preferred phosphor composition, the first luminescent material is activated by manganese alone, examples of such materials being magnesium arsenate or fluorogermanate, the second by manganese and a second activating metal, examples being calcium silicate activated by lead and manganese or magnesium fluoroborate activated by cerium and manganese, and the further luminescent material is manganese-free. The further luminescent material may contain no conventional activator, being for example barium titanium phosphate or magnesium tungstate (or a mixture thereof), or may be activated by a metal other than manganese, examples being calcium halophosphate activated by antimony, or strontium pyrophosphate activated by tin. In some cases it may be found advantageous in the interests of a final balance to include as a fourth material a white-emitting phosphor, for example calcium halophosphate activated by both antimony and manganese. A small addition of a phosphor of intensely coloured emission, for example zinc silicate activated by manganese, is useful in the final adjustment of lamp colour to a predetermined value.

Cadmium borate activated by manganese alone may be used as the second luminescent material, but the resulting composition is of poor maintenance. Zinc beryllium silicate has the disadvantage of being poisonous, though it could otherwise be used as the second luminescent material.

The lamps according to the invention will have colour appearances which differ according to the nature of precise composition of the phosphor coating. Their chromaticities vary with the colour appearance, and to some extent with the constructional details of the lamp, but generally fall within the region defined by an $x$ coefficient between 0.300 and 0.420 and a $y$ coefficient within the area lying between two lines parallel to the black body locus and separated therefrom by a respective increase of 0.010 and decreases of 0.030 in the $y$ coefficient for a given $x$ coefficient. The extension is further below the black body locus than above it since slightly purplish whites are more acceptable than slightly greenish ones. The above chromaticity range is quoted for a 5 ft. 80 w. lamp, or a lamp of similar loading. For a 4 ft. 40 w. lamp or a similarly loaded lamp the usual small shift in chromaticity will apply.

The invention is of outstanding value in the preparation of lamps of so-called "Natural" colour appearance. Lamps of this appearance are taken in this specification to have chromaticities falling within the range $x=0.365$–0.395, $y=0.345$–0.365 in the case of 5 ft. 80 w. or similarly loaded lamps and about $x=0.375$–0.405 and $y=0.340$–0.360 in the case of 4 ft. 40 w. or similarly loaded lamps.

The lamps according to the invention are characterised by their outstanding colour rendering properties, which are markedly superior to those of hitherto known lamps of similar colour appearance. The improved colour rendering is particularly valuable in the case of lamps of "Natural" colour appearance. The characteristically enhanced colour rendering is difficult to represent in numerical form, but for convenience the spectral emission can be expressed in terms of the percentage luminous flux in the bands of the C.I.E. "8-band" system. The limits of these bands are 3800, 4200, 4400, 4600, 5100, 5600, 6100, 6600 and 7600 A. The following table shows comparative values for lamps designated "A," "B" and "C" according to the invention as compared with values taken from British standard specification B.S. 1853: 1956 for lamps of closely similar colour appearance, "White," "Natural" and "Northlight," and commercially produced lamps meeting the latter specification.

TABLE

| Band | "White" | | |
|---|---|---|---|
| | B.S.S. 1853: 1956 | Commercially Produced Lamp | Lamp A |
| 1 | .008 min | .009 | .01 |
| 2 | .25 min | .26 | .32 |
| 3 | .20 min | .21 | .20 |
| 4 | 3.0 min | 3.0 | 3.5 |
| 5 | 36.0 max | 34.1 | 40.6 |
| 6 | 55.5 max | 53.6 | 42.0 |
| 7 | 8.4 min | 8.7 | 12.6 |
| 8 | .13 min | .18 | .74 |

|  | "Natural" | | |
| Band | B.S.S. 1853: 1956 | Commercially Produced Lamp | Lamp B |
|---|---|---|---|
| 1 | .01 min | .015 | .012 |
| 2 | .30 min | .37 | .35 |
| 3 | .30 min | .38 | .34 |
| 4 | 5.0 min | 5.7 | 5.9 |
| 5 | 39.0 max | 38.0 | 41.8 |
| 6 | 51.0 max | 44.6 | 35.8 |
| 7 | 8.5 min | 10.7 | 14.7 |
| 8 | 0.2 min | .31 | 1.07 |

|  | "Northlight" | | |
| Band | B.S.S. 1853: 1956 | Commercially Produced Lamp | Lamp C |
|---|---|---|---|
| 1 | .017 min | .02 | .02 |
| 2 | .42 min | .43 | .47 |
| 3 | .56 min | .64 | .63 |
| 4 | 8.1 min | 9.5 | 9.7 |
| 5 | 45.8 max | 44.7 | 47.7 |
| 6 | 39.0 max | 35.9 | 29.7 |
| 7 | 8.0 min | 8.7 | 10.8 |
| 8 | .22 min | .29 | 9.3 |

Noteworthy features of these and other types according to the present invention are the abnormally high values of bands 5, 7 and 8, and the abnormally low values of band 6.

The following phosphor compositions were used in the lamps according to the invention, and the chromaticities of the lamps were as shown:

|  | Lamp A | Lamp B | Lamp C |
|---|---|---|---|
| Magnesium fluorogermanate | 16 | 29 | 20 |
| Calcium silicate | 29 | 29 | 12 |
| Halophosphate | a 50 | b 5.1 |  |
| Zinc silicate | 5 | 2.7 |  |
| Barium titanium phosphate |  | 34.1 | 60 |
| Calcium tungstate |  |  | 8 |
| Chromaticity: |  |  |  |
| $x$ | .407 | .377 | .314 |
| $y$ | .392 | .361 | .325 | a As used in Daylight lamps.
b As used in Warm White lamps.

It will be seen that lamp A is very close to the nominal "White" chromaticity and Lamps B and C to "Natural" and "Northlight respectively. Lamp B is that described under Example 1 below.

The invention will be further described by way of example with reference to the accompanying drawing, of which the single FIGURE shows a partly cut-away side elevation of a fluorescent lamp according to the invention.

A sealed envelope 1 is provided at one end with a pair of sealed-in lead-wires 2 which carry in conventional manner a coiled-coil of tungsten wire 3 connected between them. An insulating base plate 4 is held in a metal cap 5 which is secured to the end of the envelope by cement 6, and two contact pins 7 mounted in the base plate are connected to the lead-wires 2. A similar pair of lead-wires, and coiled-coil are provided at the other end of the tube, together with a similar pair of contact pins 8 and base plate carried by the cap 9. The inner surface 10 of the envelope carries a luminescent layer of the phosphor coating.

The following examples describe the preparation of phosphor compositions and the lamps according to the invention. The lamps described are of 5 ft. 80 w. size. Lamps of other sizes or loading may be made with the same phosphor compositions, with resulting small changes in the colour of the emitted light.

*Example 1*

The following luminescent materials are milled together in a nitrocellulose binder according to the usual techniques, and lamp tubes are coated with the resulting mixture and processed in the conventional way. The halophosphate is that used for "warm white" lamps.

Parts by weight
Magnesium fluorogermanate (Mn-activated)_____ 29.0
Calcium silicate (Pb, Mn)_____ 29.0
Calcium halophosphate (Sb, Mn)_____ 5.1
Barium titanium phosphate_____ 34.1
Zinc silicate (Mn)_____ 2.7

The chromaticity of the 80 watt lamp is approximately $x=.377$, $y=.361$, or close to the "Natural" specification.

*Example 2*

A lamp is produced by the process outlined in Example 1, using the following luminescent material:

Parts by weight
Magnesium fluorogermanate (Mn)_____ 31.2
Calcium silicate (Pb, Mn)_____ 24.9
Calcium halophosphate (as used in Ex. 1)_____ 18.7
Barium titanium phosphate_____ 15.6
Zinc silicate (Mn)_____ 6.5
Magnesium tungstate_____ 3.1

The resulting lamp chromaticity is $x=.394$, $y=.382$, or close to the 3750° K. point on the black-body locus.

*Example 3*

A lamp is produced by the procedure outlined in Example 1, using the following luminescent materials:

Parts by weight
Magnesium fluorogermanate (Mn)_____ 31.7
Calcium silicate (Pb, Mn)_____ 32.2
Magnesium tungstate_____ 10.5
Barium titanium phosphate_____ 20.8
Zinc silicate (Mn)_____ 4.8

The resulting lamp chromaticity is $x=.356$, $y=.350$, having roughly the same relation to a colour temperature of 4600° K. as the "Natural" lamp has to a colour temperature of 4000° K.

*Example 4*

A lamp is produced by the procedure outlined in Example 1, using the following luminescent materials:

Parts by weight
Magnesium fluorogermanate (Mn)_____ 26.0
Magnesium fluoroborate (Ce, Mn)_____ 17.0
Calcium halophosphate (as used in Ex. 1)_____ 17.0
Barium titanium phosphate_____ 38.0
Zinc silicate (Mn)_____ 2.0

The resulting lamp chromaticity is $x=.357$, $y=.349$, that is very close to that of Example 3.

*Example 5*

A lamp is produced by the procedure outlined in Example 1, using the following luminescent materials:

Parts by weight
Magnesium fluorogermanate (Mn)_____ 30.9
Calcium silicate (Pb, Mn)_____ 28.9
Calcium halophosphate (Sb, Mn)_____ 23.6
Magnesium tungstate_____ 13.0
Zinc silicate (Mn)_____ 3.6

The resulting lamp chromaticity is $x=0.374$, $y=0.350$, which is within the region of the "Natural" specification.

I claim:

1. A low pressure fluorescent lamp comprising a sealed light-transmitting envelope, a filling of mercury and an inert gas therein, a phosphor coating on the inside of said envelope, said phosphor coating consisting essentially of at least 15% by weight of a first luminescent material having an emission peak in the region 6500–6700 A. at least 15% of a second luminescent material having an emission peak in the region 6000–6500 A., the first and second materials amounting in total to not more than 70% by weight of the coating, and at least one further luminescent material emitting over a wide band including the blue region of the spectrum and having its emission peak at a wavelength below the previously-mentioned regions of wavelengths, and being present in the phosphor in an amount at least 15% by weight of the phosphor.

2. A lamp according to claim 1 wherein the first luminescent material is activated by manganese, the second luminescent material is activated by manganese together with a second activating metal, and the further luminescent material is manganese-free.

3. A lamp according to claim 1 wherein the further luminescent material has an emission peak in the region of 5900 A.

4. A lamp according to claim 2 wherein the first luminescent material is selected from the group consisting of magnesium arsenate and fluorogermanate.

5. A lamp according to claim 2 wherein the second luminescent material is selected from the group consisting of calcium silicate activated by lead and manganese and magnesium fluoroborate activated by cerium and manganese.

6. A lamp according to claim 1 wherein the further luminescent material is selected from the group consisting of barium titanium phosphate, magnesium tungstate and mixtures thereof.

7. A lamp according to claim 1 wherein the further luminescent material is calcium halophosphate activated by antimony.

8. A lamp according to claim 6 wherein a calcium halophosphate activated by both antimony and manganese is additionally present.

9. A phosphor composition for use in a lamp according to claim 1 consisting essentially of at least 15% by weight of a first luminescent material having an emission peak in the region 6500–6700 A., at least 15% of a second luminescent material having an emission peak in the region 6000–6500 A., the first and second materials amounting in total to not more than 70% by weight of the coating, and at least one further luminescent material emitting over a wide band including the blue region of the spectrum and having its emission peak at a wavelength below the previously-mentioned regions of wavelengths, and being present in the phosphor in an amount at least 15% by weight of the phosphor.

References Cited in the file of this patent

UNITED STATES PATENTS

| | | |
|---|---|---|
| 2,178,436 | Ruttenauer | Oct. 31, 1939 |
| 2,269,819 | Isenberg | Jan. 13, 1942 |
| 2,748,303 | Thorington | May 29, 1956 |

OTHER REFERENCES

H. W. Leverenz: Luminescence of Solids, Wiley & Sons, N.Y.C., 1950, pages 411, 415, 417.